No. 834,554. PATENTED OCT. 30, 1906.
L. L. BARTLETT.
REEL CLAMP.
APPLICATION FILED MAR. 12, 1906.

WITNESSES:
F. W. Wright
Beatrice Murris

INVENTOR
Leander L. Bartlett
BY
Emerson R. Newell
ATTORNEY

UNITED STATES PATENT OFFICE.

LEANDER L. BARTLETT, OF MONTAGUE CITY, MASSACHUSETTS.

REEL-CLAMP.

No. 834,554. Specification of Letters Patent. Patented Oct. 30, 1906.

Application filed March 12, 1906. Serial No. 305,458.

*To all whom it may concern:*

Be it known that I, LEANDER L. BARTLETT, a citizen of the United States, residing at Montague City, Massachusetts, have invented certain new and useful Improvements in Reel-Clamps, of which the following is a clear, full, and exact description.

The object of this invention is to provide an improved sliding reel seat or clamp for fishpole-butt which may be readily slid to and fro upon the butt and securely clamped in place by the mere rotation of a collar having a threaded internal bore.

The essential features of the invention reside in the sleeve which carries the movable reel-seat; and it consists in forming wedges upon the outside of the sleeve, which are fast thereon, and preferably upon diametrically opposite sides of the sleeve, and in a collar with an internally-threaded bore, preferably threaded for a portion of its depth only, which fits upon a portion of the sleeve provided with an annular thread. The collar extends forwardly to engage the wedges before mentioned more or less, according to the amount of rotation imparted to the collar, and thus to force the opposite sides of the sleeve into close engagement with the butt. A portion of the sleeve is upset outwardly to form the reel-carrying seat. The butt is provided with usual longitudinal ribs, with which grooves on the inner surface of the sleeve engage.

Figure 1:
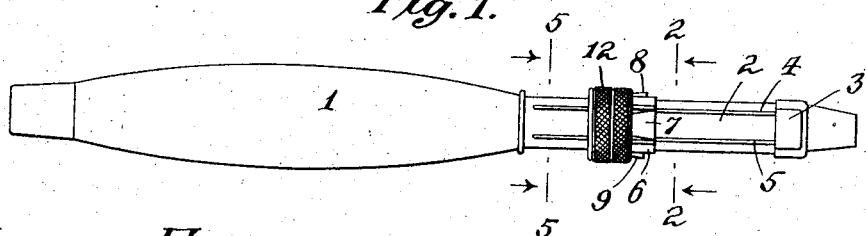
Figure 3:
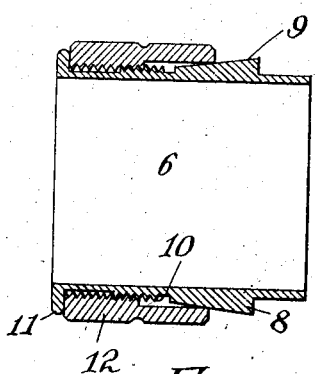
Figure 2:
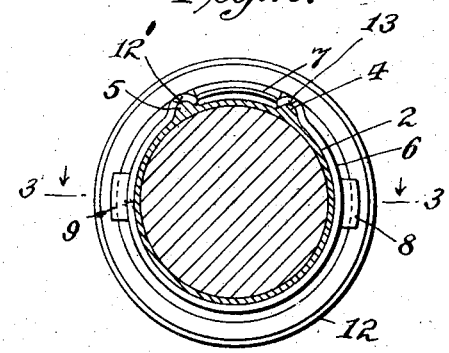
Figure 4:
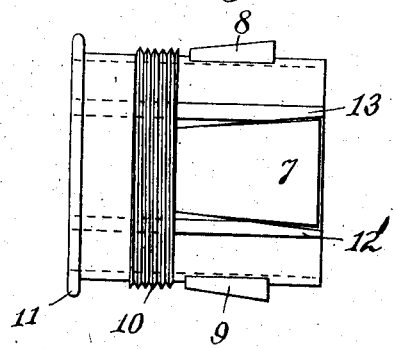
Figure 5:
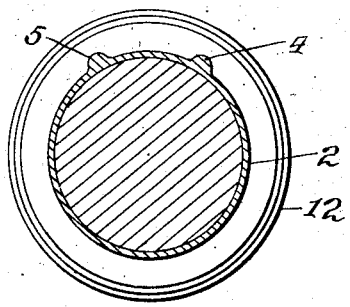

In the accompanying drawings, Figure 1 is a side elevation of a fishpole-butt provided with my improved reel seat and clamp. Fig. 2 is a view, drawn to an enlarged scale, on line 2 2 of Fig. 1. Fig. 3 is a sectional view on line 3 3, Fig. 2, with clamp and sleeve removed from the butt. Fig. 4 is a plan view of the sleeve with the collar removed. Fig. 5 is a view on line 5 5, Fig. 1, drawn to the scale of the preceding three figures.

As shown in the drawings, 1 is the handle of a fishpole-butt, provided with a cylindrical tube 2 for the seating of the reel, having a stationary reel-seat 3 at one end and having longitudinal ribs 4 and 5 upon its surface for the guidance of the sleeve to be now described.
The sleeve 6 is tubular and has a portion 7 upset from its cylindrical surface to provide a seat or socket for the engagement of the reel. Wedges 8 and 9, preferably diametrically opposite, are permanently secured to the outside of the sleeve. Near the rear end of the wedges I provide the sleeve with an annular threaded portion 10, to the rear of which there is upset a flange 11 after the ring 12 has been put in place. The sleeve has two grooves 12' and 13 formed longitudinally in the metal of the sleeve, so that when the sleeve is in place on the part 2 the sleeve will be prevented from rotation while free to slide longitudinally. The ring 12 is formed with a knurled outer surface, while its inner bore is threaded for half its depth and smooth for the other half, the ring being inserted upon the sleeve so that the smooth half lies over the wedges 8 and 9 more or less.

It will be readily seen, particularly with reference to Fig. 1, that the sleeve may be moved to any desired position on the part 2, and then a sufficient rotation of the ring 12 will cause the wedges 8 and 9 to be moved toward each other to compress the sleeve upon opposite sides against the part 2, and thus firmly clamp it in position.

What I claim is—

1. In combination with a fishpole-butt having a non-rotatable slidable reel-seat sleeve, a wedge formed solid upon the outside of said sleeve and projecting longitudinally to the bore of the sleeve, a threaded portion on the sleeve and a collar with a threaded bore engaging said threaded portion.

2. In combination with a fishpole-butt having a non-rotatable slidable reel-seat sleeve, a wedge formed solid with said sleeve, a threaded portion on the sleeve and a collar with a threaded bore engaging said threaded portion, said collar having part of its bore smooth on that side adjacent to the wedge.

3. In combination with a fishpole-butt having longitudinal projections, a sleeve with grooves fitting the projections, wedges fast on diametrically opposite sides of the sleeve, a threaded portion on the sleeve, an enlarged rear end on the sleeve, a collar having a partly-smooth bore and a partly-threaded bore, the smooth part adjacent to the wedges, the threaded part toward the enlarged rear end, a part of the sleeve upset away from the butt to form a seat for the reel.

4. In combination with a fishpole-butt having a non-rotatable slidable reel-seat sleeve, a wedge formed solid upon the outside of said sleeve and projecting longitudinally to the bore of the sleeve, a threaded portion on the sleeve and a collar with a threaded bore engaging said threaded portion and a flange upon the end of the sleeve between which flange and the wedge said collar is free to rotate being held from removal from the sleeve by the flange.

Signed at Montague City, Massachusetts, this 8th day of March, 1906.

LEANDER L. BARTLETT.

Witnesses:
CHARLES W. SCHULER,
ROBERT E. KELES.